United States Patent
Seo et al.

(10) Patent No.: US 9,660,783 B2
(45) Date of Patent: May 23, 2017

(54) METHOD AND DEVICE FOR RECEIVING CONTROL INFORMATION IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 151 days.

(21) Appl. No.: 14/384,139

(22) PCT Filed: Apr. 1, 2013

(86) PCT No.: PCT/KR2013/002692
§ 371 (c)(1),
(2) Date: Sep. 9, 2014

(87) PCT Pub. No.: WO2013/147566
PCT Pub. Date: Oct. 3, 2013

(65) Prior Publication Data
US 2015/0139093 A1 May 21, 2015

Related U.S. Application Data

(60) Provisional application No. 61/617,674, filed on Mar. 30, 2012, provisional application No. 61/620,432, (Continued)

(30) Foreign Application Priority Data

Apr. 1, 2013 (KR) .................. 10-2013-0035206

(51) Int. Cl.
*H04L 5/00* (2006.01)

(52) U.S. Cl.
CPC .......... *H04L 5/0053* (2013.01); *H04L 5/0023* (2013.01); *H04L 5/0051* (2013.01)

(58) Field of Classification Search
CPC .... H04L 5/0053; H04L 5/0051; H04L 5/0023
(Continued)

(56) References Cited

U.S. PATENT DOCUMENTS

2013/0044664 A1* 2/2013 Nory ................ H04L 1/0045
370/311
2013/0114419 A1* 5/2013 Chen ................ H04L 5/0053
370/248

(Continued)

FOREIGN PATENT DOCUMENTS

CN 102170703 8/2011
JP 2015-513277 4/2015
(Continued)

OTHER PUBLICATIONS

Fujitsu, "Antenna ports for ePDCCH detection," 3GPP TSG RAN WG1 Meeting #68bis, R1-121191, Mar. 2012, 4 pages.
(Continued)

*Primary Examiner* — Obaidul Huq
(74) *Attorney, Agent, or Firm* — Lee Hong Degerman Kang & Waimey

(57) ABSTRACT

The present invention according to one embodiment relates to a method for enabling a terminal to receive control information in a wireless communication system, and the method for receiving the control information comprises the step of attempting to decode a set of enhanced physical downlink control channel (EPDCCH) candidates according to each set level, wherein a minimum value among the values available as the set levels is set according to the
(Continued)

amount of available resources for an EPDCCH within a physical resource block (PRB) pair that is attempting to decode.

10 Claims, 14 Drawing Sheets

Related U.S. Application Data filed on Apr. 4, 2012, provisional application No. 61/649,923, filed on May 21, 2012.

(58) Field of Classification Search
USPC ....... 370/310, 328, 329, 330, 338, 340, 341, 370/431, 432, 436, 464, 465
See application file for complete search history.

(56) References Cited

U.S. PATENT DOCUMENTS

| | | | | |
|---|---|---|---|---|
| 2013/0114521 A1* | 5/2013 | Frenne | ................. | H04L 5/0053 370/329 |
| 2013/0114529 A1* | 5/2013 | Chen | ..................... | H04L 1/1812 370/329 |
| 2013/0215842 A1* | 8/2013 | Han | .................... | H04W 72/042 370/329 |
| 2013/0242904 A1* | 9/2013 | Sartori | ................. | H04L 5/0053 370/329 |

FOREIGN PATENT DOCUMENTS

| | | |
|---|---|---|
| KR | 10-2008-0099063 | 11/2008 |
| KR | 10-2008-0111393 | 12/2008 |
| KR | 10-2009-0089770 | 8/2009 |
| KR | 10-2009-0101043 | 9/2009 |
| WO | 2009/058905 | 5/2009 |
| WO | 2011/074265 | 6/2011 |
| WO | 2011/074914 | 6/2011 |
| WO | 2013/141801 | 9/2013 |

OTHER PUBLICATIONS

Qualcomm Incorporated, "Reference signals for e-PDCCH," 3GPP TSG RAN WG1 #68bis, R1-121570, Mar. 2012, 4 pages.
Motorola Mobility, "EPDCCH Design Aspects," 3GPP TSG RAN WG1 Meeting #68bis, R1-121583, Mar. 2012, 4 pages.
Fujitsu, "UE-Specific Search Space Design for Enhanced Downlink Control Channel," 3GPP TSG-RAN WG1 #68bis, R1-121195, Mar. 2012, 6 pages.
Qualcomm Incorporated, "Multiplexing different DCI messages for e-PDCCH," 3GPP TSG RAN WG1 #68bis, R1-121572, Mar. 2012, 2 pages.
European Patent Office Application Serial No. 13768196.1, Search Report dated Nov. 5, 2015, 8 pages.
ZTE Corporation, "Mapping Design for enhanced PDCCH," 3GPP TSG RAN WG1 Meeting #68bis, R1-121055, Mar. 2012, 4 pages.
China Telecom, "On REs Mapping Design," 3GPP TSG RAN WG1 Meeting #68bis, R1-121132, Mar. 2012, 4 pages.
PCT International Application No. PCT/KR2013/002692, Written Opinion of the International Searching Authority dated Jul. 26, 2013, 1 page.
NTT DOCOMO, "UE-Specific DL DM-RS Sequence for Rel-11 CoMP," 3GPP TSG RAN WG1 #68, R1-120407, Feb. 2012, 4 pages.
LG Electronics, "On EPDCCH Candidates and Aggregation Levels," 3GPP TSG RAN WG1 #70, R1-124321, Oct. 2012, 7 pages.
LG Electronics, "On Aggregating ECCEs for EPDCCH Candidate," 3GPP TSG RAN WG1 #70, R1-123529, Aug. 2012, 7 pages.
ZTE, "Discussion on ePDCCH candidates and search space design," 3GPP TSG RAN WG1 #70, R1-123374, Aug. 2012, 8 pages.
Ericsson, et al., "On Aggregation Levels for ePDCCH," 3GPP TSG RAN WG1 #69, R1-122002, May 2012, 2 pages.
Samsung, "Search Space Design for E-PDCCHs," 3GPP TSG RAN WG1 #68, R1-120190, Feb. 2012, 3 pages.
LG Electronics, "On EPDCCH Candidates and Aggregation Levels," 3GPP TSG RAN WG1 #70bis, R1-124321, Oct. 2012, 7 pages.
The State Intellectual Property Office of the People's Republic of China Application No. 201380018540.6, Office Action dated Nov. 2, 2016, 6 pages.

* cited by examiner

FIG. 6
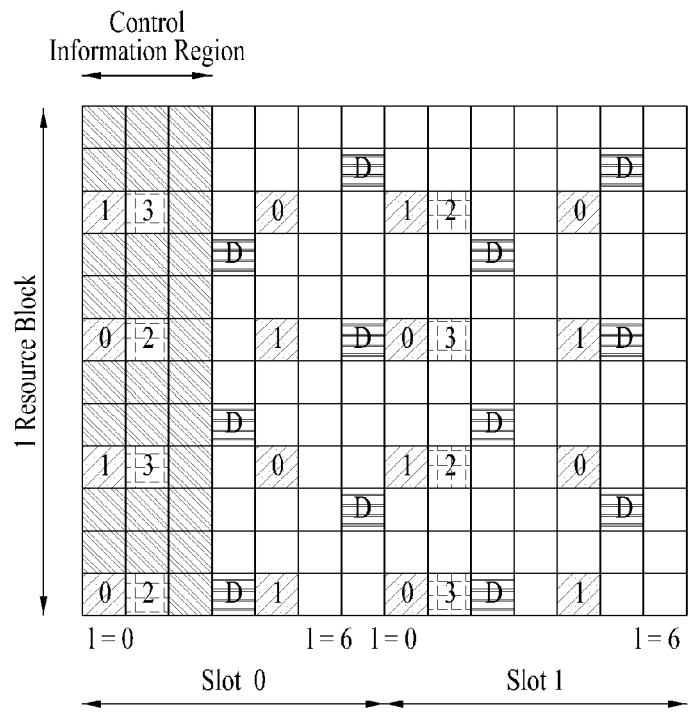
(a)
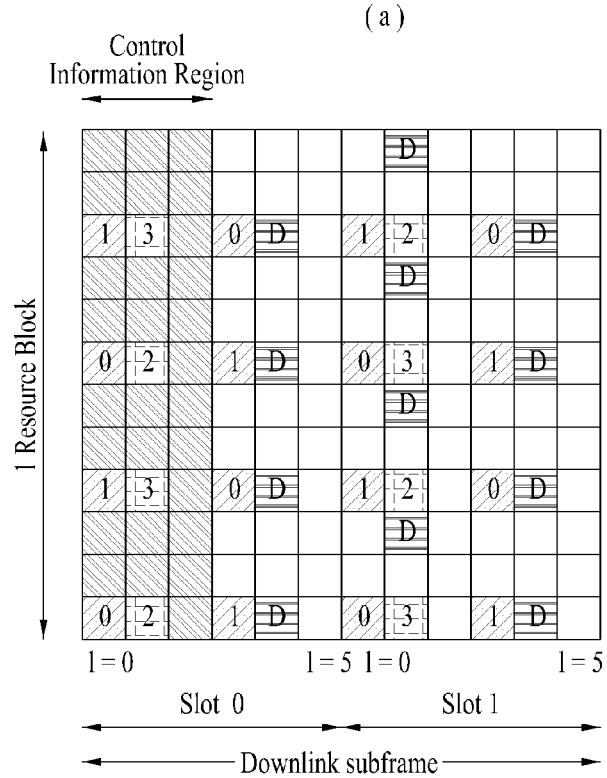
(b)

METHOD AND DEVICE FOR RECEIVING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2013/002692, filed on Apr. 1, 2013, which claims the benefit of earlier filing date and right of priority to Korean Application No 10-2013-0035206, filed on Apr. 1, 2013 and also claims the benefit of U.S. Provisional Application Ser. No. 61/617,674, filed on Mar. 30, 2012, 61/620,432, filed on Apr. 4, 2012, 61/649,923, filed on May 21, 2012, the contents of which are all hereby incorporated by reference herein in their entirety.

TECHNICAL FIELD

The following description relates to a wireless communication system and, more particularly, a method and apparatus for receiving control information via an enhanced physical downlink channel (EPDCCH).

BACKGROUND ART

Wireless communication systems have been diversified in order to provide various types of communication services such as voice or data service. In general, a wireless communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system a Multi Carrier Frequency Division Multiple Access (MC-FDMA) system and the like.

DISCLOSURE

Technical Problem

In the present invention, disclosed herein is a method for receiving control information via blind decoding of an EPDCCH and, more particularly, embodiments of the case in which the amount of available resources for an EPDCCH is relatively small.

The technical problems solved by the present invention are not limited to the above technical problems and other technical problems which are not described herein will become apparent to those skilled in the art from the following description.

Technical Solution

The object of the present invention can be achieved by providing a method for receiving control information at a user equipment (UE) in a wireless communication system including attempting to decode a set of enhanced physical downlink control channel (EPDCCH) candidates at each of aggregation levels, wherein a minimum value among values available as the aggregation levels is determined according to the amount of available resources for the EPDCCH in a physical resource block (PRB) pair for the decoding attempt.

In another aspect of the present invention, provided herein is a user equipment (UE) apparatus in a wireless communication system including a reception module and a processor, wherein the processor attempts to decode a set of enhanced physical downlink control channel (EPDCCH) candidates at each of aggregation levels and a minimum value among values available as the aggregation levels is determined according to the amount of available resources for the EPDCCH in a physical resource block (PRB) pair for the decoding attempt.

The above-described aspects of the present invention may include the following features.

The minimum value among values available as the aggregation levels when the amount of available resources for the EPDCCH is less than a predetermined value may be set to be greater than the minimum value among values available as the aggregation levels when the amount of available resources for the EPDCCH is greater than the predetermined value.

The minimum value of the values available as the aggregation levels may corresponds to 2 when the amount of available resources for the EPDCCH is less than the predetermined value and may corresponds to 1 when the amount of available resources for the EPDCCH is greater than the predetermined value.

The values available as the aggregation levels when the amount of available resources for the EPDCCH is less than the predetermined value may be 2, 4, 8 and 16 and the values available as the aggregation levels when the amount of available resources for the EPDCCH is greater than the predetermined value may be 1, 2, 4 and 8.

The resources may be resource elements (REs).

The PRB pair may include four enhanced control channel elements (ECCEs).

The ECCE may include available resources for the EPDCCH and resources unrelated to the EPDCCH.

The UE may extract and decode only the available resources for the EPDCCH from the ECCE.

The UE may receive information for determining the resources unrelated to the EPDCCH from a base station.

The information may be received via higher layer signaling.

The UE may exclude an ECCE of a PRB pair, on which at least one of a physical broadcast channel (PBCH) or a synchronization channel is transmitted, upon attempting decoding.

The PRB pair may be included in any one of PRB pairs for localized EPDCCH transmission and PRB pairs for distributed EPDCCH transmission.

Advantageous Effects

According to the present invention, it is possible to maintain coding gain even when the amount of available resources for an EPDCCH is small.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 6 is a diagram illustrating a reference signal;

BEST MODE

Figure 1:
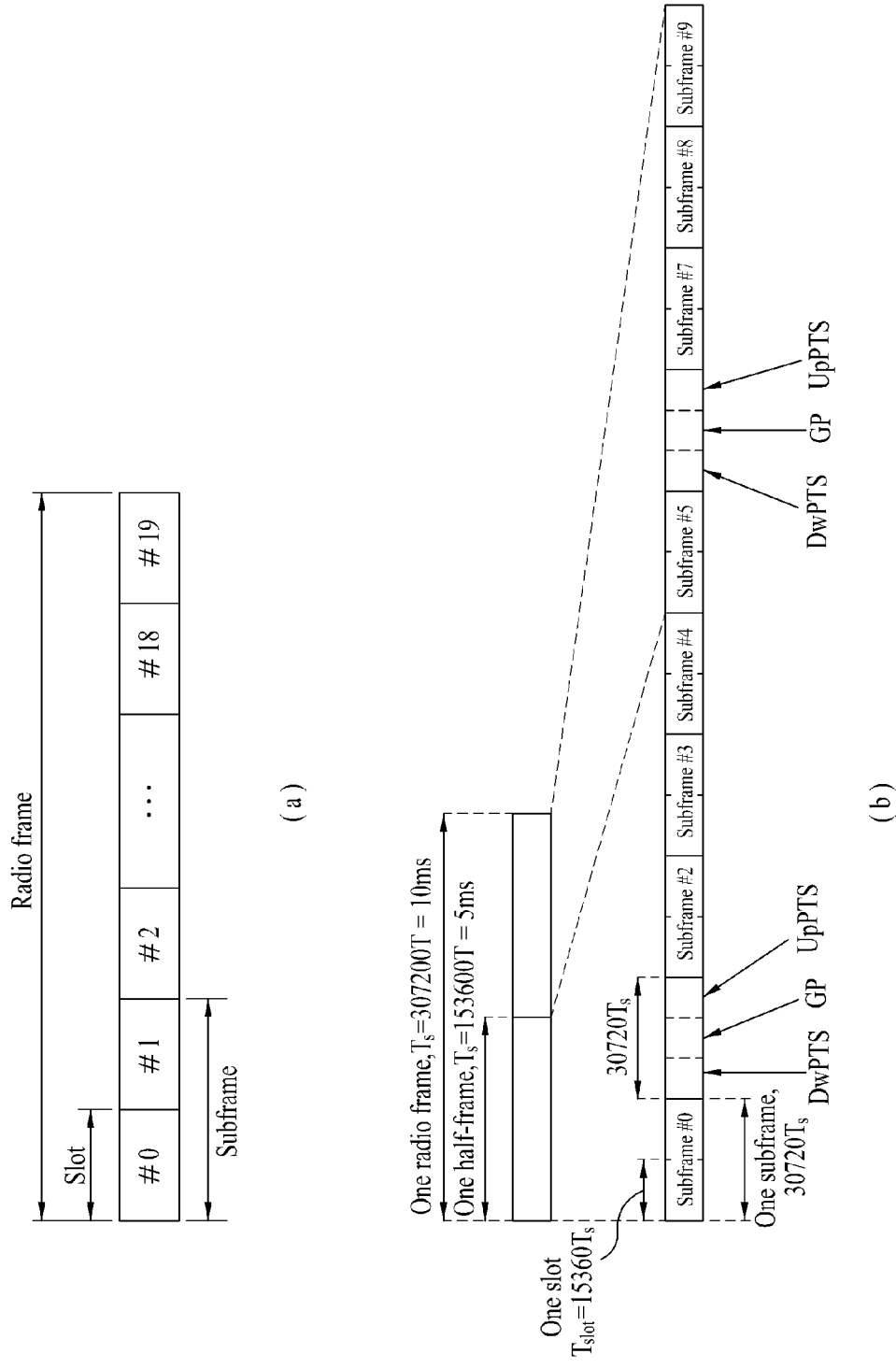
FIG. 1 is a diagram showing the structure of a radio frame.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to others. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or network nodes other than the base station. The term base station (BS) may be replaced with the terms fixed station, Node-B, eNode-B (eNB), or access point (AP) as necessary. The term relay may be replaced with the terms relay node (RN) or relay station (RS). The term terminal may also be replaced with the term user equipment (UE), mobile station (MS), mobile subscriber station (MSS) or subscriber station (SS).

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of radio access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied as wireless (or radio) technology such as GSM (Global System for Mobile communications)/GPRS (General Packet Radio Service)/EDGE (Enhanced Data Rates for GSM Evolution). OFDMA may be embodied as wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE. WiMAX can be explained by IEEE 802.16e standard (WirelessMAN-OFDMA Reference System) and advanced IEEE 802.16m standard (WirelessMAN-OFDMA Advanced system). For clarity, the following description focuses on a 3GPP LTE and 3GPP LTE-A system. However, technical features of the present invention are not limited thereto.

Referring to FIG. 1, the structure of a radio frame will be described.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in downlink, an OFDM symbol indicates one symbol period. The OFDM symbol may be referred to as an SC-FDMA symbol or symbol period. A RB as a resource assignment unit may include a plurality of consecutive subcarriers in one slot.

The number of OFDM symbols included in one slot may be changed according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of first two or three OFDM symbols of each subframe may be assigned to a physical downlink control channel (PDCCH) and the remaining OFDM symbols may be assigned to a physical downlink shared channel (PDSCH).

FIG. 1(b) shows the structure of the type-2 radio frame. The type-2 radio frame includes two half frames and each half frame includes five subframes, a downlink pilot time slot (DwPTS), a guard period (GP) and an uplink pilot time slot (UpPTS). One subframe includes two slots. The DwPTS is used for initial cell search, synchronization or channel estimation of a UE. The UpPTS is used for channel estimation of a BS and uplink transmission synchronization of a UE. The GP is used to eliminate interference generated in uplink due to multi-path delay of a downlink signal between uplink and downlink.

The structure of the radio frame is only exemplary and the number of subframes included in the radio frame, the number of slots included in the subframe, or the number of symbols included in the slot may be variously changed.

Figure 2:
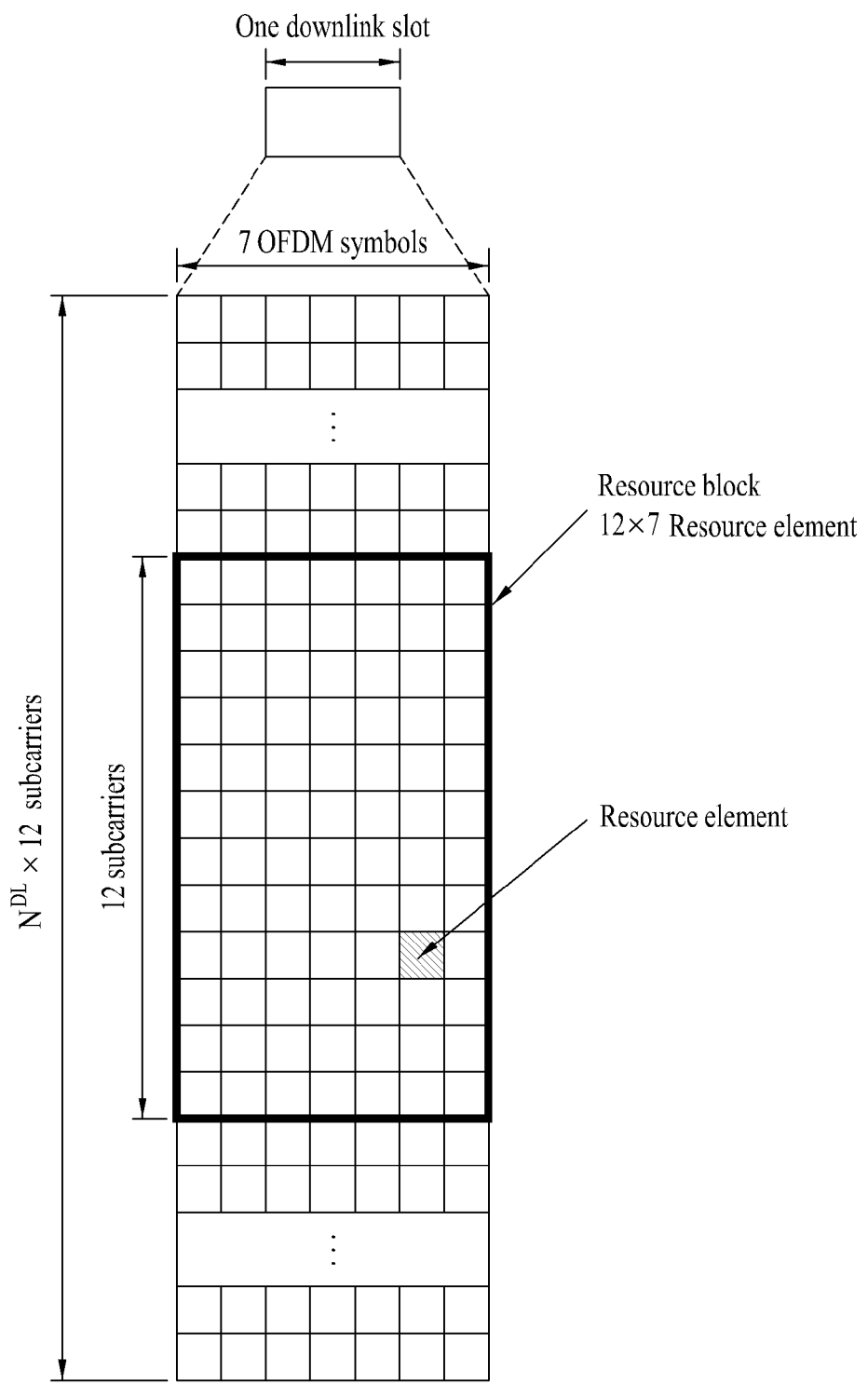
FIG. 2 is a diagram showing a resource grid of a downlink slot.

FIG. 2 is a diagram showing a resource grid of a downlink slot. Although one downlink slot may include seven OFDM symbols in a time domain and one RB may include 12 subcarriers in a frequency domain, the present invention is not limited thereto. For example, one slot includes 7 OFDM symbols in a normal cyclic prefix (CP), whereas one slot includes six OFDM symbols in an extended CP. Each element on the resource grid is referred to as a resource element (RE). One RB includes 12×7 REs. The number $N^{DL}$ of RBs included in a downlink slot depends on downlink transmission bandwidth. The structure of the uplink slot may be equal to that of the downlink slot.

Figure 3:
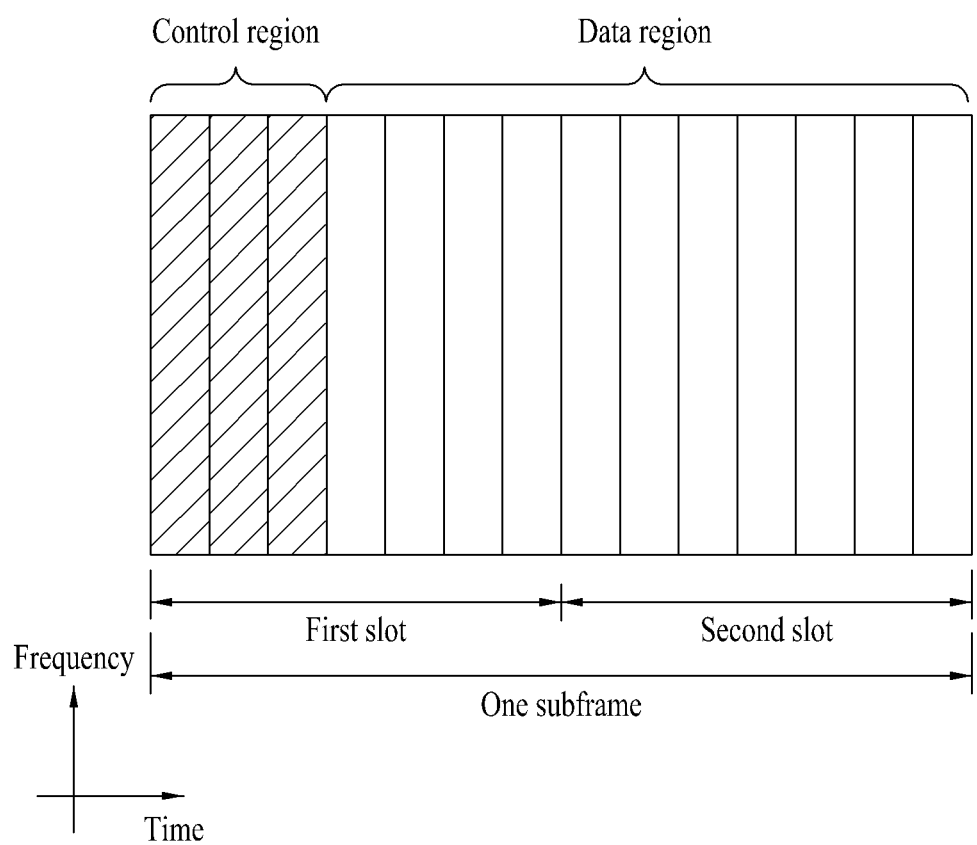
FIG. 3 is a diagram showing the structure of a downlink subframe.

FIG. 3 is a diagram showing the structure of a downlink subframe. A maximum of three OFDM symbols of a front portion of a first slot within one subframe corresponds to a control region to which a control channel is assigned. The remaining OFDM symbols correspond to a data region to which a Physical Downlink Shared Channel (PDSCH) is assigned. Examples of the downlink control channels used in 3GPP LTE include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted on a first OFDM symbol of a subframe, and includes information about the number of OFDM symbols used to transmit the control channel within the subframe. The PHICH includes a HARQ ACK/NACK signal in response to uplink transmission. The control information transmitted through the PDCCH is referred to as Downlink Control Information (DCI). The DCI includes uplink resource assignment information, downlink resource assignment information or an uplink transmit power control command for an arbitrary UE group. The PDCCH may include resource assignment and transmission format of a Downlink Shared Channel (DL-SCH), resource assignment information of an Uplink Shared Channel (UL-SCH), paging information of a Paging Channel (PCH), system information on the DL-SCH, resource assignment of an higher layer control message such as a Random Access Response (RAR) transmitted on the PDSCH, a set of transmit power control commands for an individual UEs in an arbitrary UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or more contiguous control channel elements (CCEs). The CCE is a logical assignment unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The eNB determines a PDCCH format according to DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
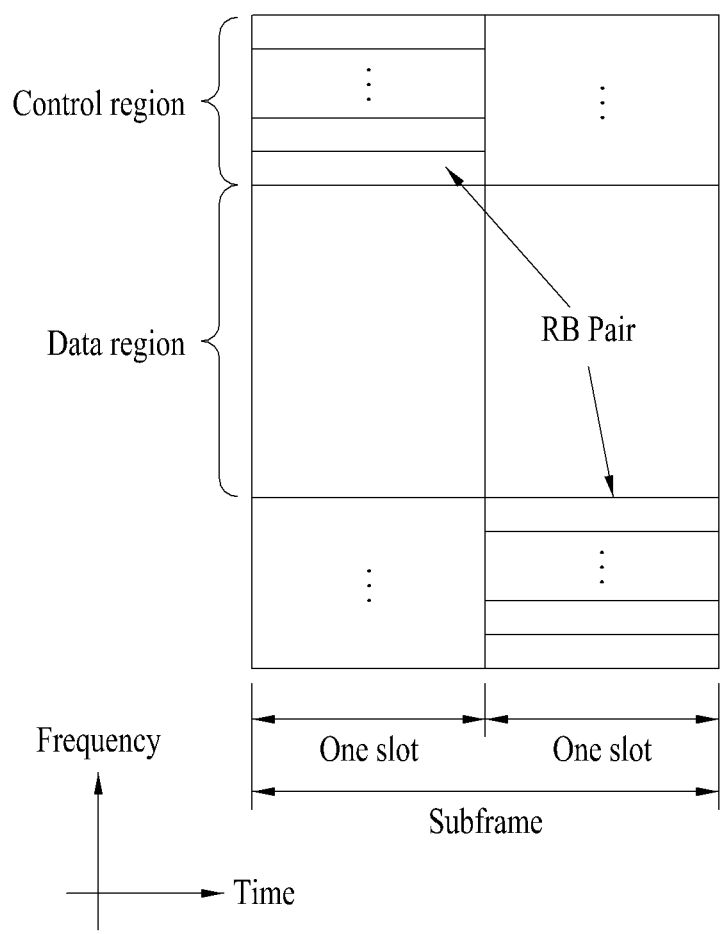
FIG. 4 is a diagram showing the structure of an uplink subframe.

FIG. 4 is a diagram showing the structure of an uplink frame. The uplink subframe may be divided into a control region and a data region in a frequency domain. A Physical Uplink Control Channel (PUCCH) including uplink control information is assigned to the control region. A Physical uplink Shared Channel (PUSCH) including user data is assigned to the data region. In order to maintain single carrier property, one UE does not simultaneously transmit the PUCCH and the PUSCH. The PUCCH for one UE is assigned to a RB pair in a subframe. RBs belonging to the RB pair occupy different subcarriers with respect to two slots. Thus, the RB pair assigned to the PUCCH is "frequency-hopped" at a slot boundary.

DCI Format

According to current LTE-A (release 10), DCI formats 0, 1, 1A, 1B, 1C, 1D, 2, 2A, 2B, 2C, 3, 3A and 4 are defined. Here, DCI formats 0, 1A, 3 and 3A are defined to have the same message size in order to reduce the number of times of blind decoding. Such DCI formats may be divided into i) DCI formats 0 and 4 used for uplink grant, ii) DCI formats 1, 1A, 1B, 1C, 1D, 2, 2A, 2B and 2C used for downlink scheduling assignment, and iii) DCI formats 3 and 3A for power control command, according to usage of control information to be transmitted.

DCI format 0 used for uplink grant may include a carrier indicator necessary for carrier aggregation, an offset used for differentiating between DCI formats 0 and 1A (flag for format 0/format 1A differentiation), a frequency hopping flag indicating whether frequency hopping is used for uplink PUSCH transmission, information about resource block assignment to be used by a UE for PUSCH transmission, a modulation and coding scheme, a new data indicator used to empty a buffer for initial transmission in association with a HARQ process, a TPC command for scheduled for PUSCH, a cyclic shift for demodulation reference signal (DMRS) and OCC index, an uplink (UL) index necessary for TDD operation and channel quality indicator (CQI) request information. Since DCI format 0 uses synchronization HARQ, a redundancy version is not included as in DCI formats related to downlink scheduling assignment. A carrier offset is not included in the DCI format if cross carrier scheduling is not used.

DCI format 4 is newly added in LTE-A release 10 in order to apply spatial multiplexing to uplink transmission in LTE-A. Since DCI format 4 further includes information about spatial multiplexing as compared to DCI format 0, DCI format 4 has a larger message size and further includes additional control information in addition to control information included in DCI format 0. That is, DCI format 4 further includes a modulation and coding scheme for a second transport block, precoding information for multi-antenna transmission and sounding reference signal (SRS) request information. Since DCI format 4 has a size greater than that of DCI format 0, DCI format 4 does not include an offset for differentiating between DCI formats 0 and 1A.

DCI formats 1, 1A, 1B, 1C, 1D, 2, 2A, 2B and 2C related to downlink scheduling assignment may be broadly divided into DCI formats 1, 1A, 1B, 1C and 1D which do not support spatial multiplexing and DCI formats 2, 2A, 2B and 2C which support spatial multiplexing.

DCI format 1C supports only consecutive frequency assignment as compact downlink assignment and does not include a carrier offset and a redundancy version as compared to other formats.

DCI format 1A is a format for downlink scheduling and random access procedure. DCI format 1A may include a carrier offset, an indicator indicating whether distributive downlink transmission is used, PDSCH resource assignment information, a modulation and coding scheme, a redundancy version, a HARQ processor number indicating a processor used for soft combining, a new data offset used to empty a buffer for initial transmission in association with a HARQ process, a transmit power control command for PUCCH and an uplink index necessary for TDD operation.

Most control information of DCI format 1 is similar to that of DCI format 1A. While DCI format 1A is related to consecutive resource assignment, DCI format 1 supports non-consecutive resource assignment. Accordingly, since DCI format 1 further includes a resource assignment header, control signaling overhead is slightly increased as resource assignment flexibility is increased.

DCI formats 1B and 1D are similar in that precoding information is further included as compared to DCI format 1. DCI format 1B includes PMI confirmation and DCI format 1D includes downlink power offset information. Most control information included in DCI formats 1B and 1C is equal to that of DCI format 1A.

DCI formats 2, 2A, 2B and 2C further include spatial multiplexing information in addition to most of the control information included in DCI format 1A. That is, a modulation and coding scheme for a second transport block, a new data offset and a redundancy version may be further included.

DCI format 2 supports closed-loop spatial multiplexing and DCI format 2A supports open-loop spatial multiplexing. DIC formats 2 and 2A include precoding information. DCI format 2B supports dual layer spatial multiplexing combined with beamforming and further includes cyclic shift information for DMRS. DCI format 2C may be understood as an extension of DCI format 2B and supports spatial multiplexing of up to eight layers.

DCI formats 3 and 3A may be used to supplement transmit power control information included in DCI formats for uplink grant and downlink scheduling assignment, that is, to support semi-persistent scheduling. In case of DCI format 3, a 1-bit command is used per UE and, in case of DCI format 3A, a 2-bit command is used per UE.

Any one of the above-described DCI formats may be transmitted via one PDCCH and a plurality of PDCCHs may be transmitted in a control region. The UE may monitor a plurality of PDCCHs.

PDCCH Processing

A control channel element (CCE), which is a consecutive logical assignment unit, is used when mapping PDCCHs to REs. One CCE includes a plurality (e.g., 9) of resource element groups (REGs) and one REG is composed of four neighboring REs in a state of excluding a reference signal (RS).

The number of CCEs necessary for a specific PDCCH is changed according to DCI payload which is a size of control information, cell bandwidth, channel coding rate, etc. More specifically, the number of CCEs for a specific PDCCH may be defined according to PDCCH format as shown in Table 1 below.

TABLE 1

| PDCCH format | Number of CCEs | Number of REGs | Number of bits of PDCCH |
| --- | --- | --- | --- |
| 0 | 1 | 9 | 72 |
| 1 | 2 | 18 | 144 |
| 2 | 4 | 36 | 288 |
| 3 | 8 | 72 | 576 |

A PDCCH may use any one of the four formats as described above. However, a UE is not informed of the PDCCH format. Accordingly, the UE should perform decoding in a state of being unaware of the PDCCH format, which is referred to as blind decoding. When the UE decodes all possible CCEs used for downlink with respect to each PDCCH format, a large burden is imposed on the UE. Therefore, a search space is defined in consideration of scheduling restrictions and the number of times of decoding.

That is, the search space is a set of candidate PDCCHs including CCEs which should be decoded by the UE at an aggregation levels. Here, the aggregation levels and the number of PDCCH candidates may be defined as shown in Table 2 below.

TABLE 2

| Search space | | Number of |
|---|---|---|
| Aggregation level | Size (CCE unit) | PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 2, since four aggregation levels are present, the UE has a plurality of search spaces according to aggregation level. As shown in Table 2 above, the search space may be divided into a UE-specific search space and a common search space. The UE-specific search space is used for specific UEs. Each UE may monitor the UE-specific search space (attempt to decode the set of PDCCH candidates according to possible DCI format), check an RNTI and CRC masked to a PDCCH and acquire control information if the RNTI and CRC are valid.

The common search space is used when a plurality of UEs or all UEs need to receive a PDCCH, such as a dynamic scheduling or paging message of system information. The common search space may be used for a specific UE for resource management. In addition, the common search space may overlap the UE-specific search space. The search space may be determined by Equation 1 below.

$$L\{(Y_k+m') \bmod \lfloor N_{CCE,k}/L \rfloor\}+i \quad \text{Equation 1}$$

where, L denotes an aggregation level, $Y_k$ denotes a variable determined by an RNTI and a subframe number k, m' denotes the number of PDCCH candidates, which is $m'=m+M^{(L)} \cdot n_{CI}$ if carrier aggregation is applied and, otherwise, m'=m (m=0, ..., $M^{(L)}-1$), $M^{(L)}$ denotes the number of PDCCH candidates, $N_{CCE,k}$ denotes a total number of CCEs of a control region at a k-th subframe, and i denotes a factor for specifying an individual CCE at each PDCCH candidate in a PDCCH (i=0, ..., L−1). In a common search space, $Y_k$ is always set to 0.

Figure 5:
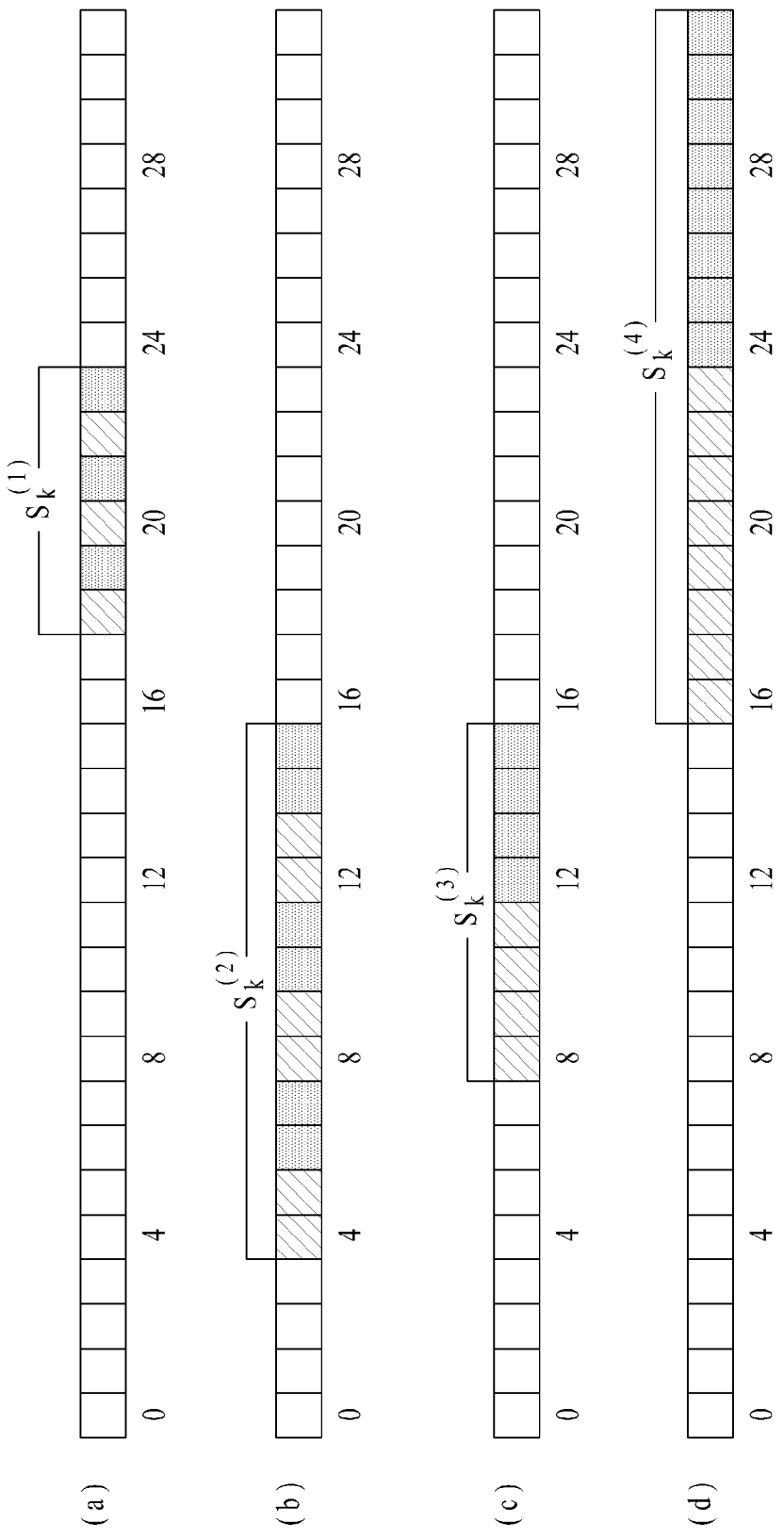
FIG. 5 is a diagram illustrating a search space.

FIG. 5 shows a UE-specific search space (shadow portion) at each aggregation level which may be defined according to Equation 1 above. Here, carrier aggregation is not used and $N_{CCE,k}$ is 32 for convenience of description.

FIGS. 5(a), (b), (c) and (d) respectively show aggregation levels 1, 2, 4 and 8 and a numeral denotes a CCE number. In FIG. 5, at each aggregation level, a start CCE of the search space is determined by the RNTI and the subframe number k as described above, may be differently determined according to aggregation level due to a modulo function and L within the same subframe with respect to one UE, and is always set to a multiple of the aggregation level due to L. Here, assume that $Y_k$ is a CCE number 18. At the start CCE, the UE sequentially attempts decoding in CCE units determined according to the aggregation level. For example, in FIG. 9(b), the UE attempts decoding from CCE number 4, which is the start CCE, in units of two CCEs according to aggregation level.

As described above, the UE attempts decoding with respect to the search space and the number of decoding attempts is determined by a transmission mode determined via DCI format and RRC signaling. If carrier aggregation is not applied, since the UE considers two DCI sizes (DCI format 0/1A/3/3a and DCI format 1C) with respect to six PDCCH candidates in the common search space, a maximum of 12 decoding attempts is necessary. In the UE-specific search space, since two DCI sizes are considered with respect to the number (6+6+2+2=16) of PDCCH candidates, a maximum of 32 decoding attempts is necessary. Accordingly, if carrier aggregation is not applied, a maximum of 44 decoding attempts is necessary.

If carrier aggregation is applied, the number of times of decoding for the UE-specific search space and DCI format is increased by the number of downlink resources (component carriers). Thus, a maximum number of times of decoding is further increased.

Reference Signal (RS)

When packets are transmitted in a wireless communication system, since the transmitted packets are transmitted via a radio channel, signal distortion may occur in a transmission process. In order to enable a receiver to accurately receive the distorted signal, distortion of the received signal should be corrected using channel information. In order to detect the channel information, a method of transmitting a signal which is known to a transmitter and a receiver and detecting channel information using a distortion degree when the signal is received via the channel is mainly used. This signal is referred to as a pilot signal or a reference signal.

If data is transmitted and received using multiple antennas, a channel state between each transmission antenna and each reception antenna should be known in order to accurately receive a signal. Accordingly, a reference signal is present per transmit antenna and, more particularly, per antenna port.

The reference signal may be divided into an uplink reference signal and a downlink reference signal. In a current LTE system, the uplink reference signal includes:

i) a demodulation reference signal (DM-RS) for channel estimation for coherent demodulation of information transmitted via a PUSCH and a PUCCH, and ii) a sounding reference signal (SRS) for measuring uplink channel quality of a network at different frequencies at the BS.

The downlink reference signal includes:

i) a cell-specific reference signal (CRS) shared by all UEs in the cell, ii) a UE-specific reference signal for a specific UE, iii) a demodulation-reference signal (DM-RS) transmitted for coherent demodulation if a PDSCH is transmitted, iv) a channel state information-reference signal (CSI-RS) for delivering channel state information (CSI) if a downlink DMRS is transmitted, v) an MBSFN reference signal transmitted for coherent demodulation of a signal transmitted in a multimedia broadcast single frequency network (MBSFN) mode, and vi) a positioning reference signal used to estimate geographic position information of the UE.

The reference signals may be broadly divided into two reference signals according to the purpose thereof. There are a reference signal for acquiring channel information and a reference signal used for data demodulation. Since the former reference signal is used when the UE acquires channel information in downlink, the reference signal is transmitted over a wide band and even a UE which does not receive downlink data in a specific subframe should receive the reference signal. This reference signal is used even in handover. The latter reference signal is sent by the BS along with resources in downlink. The UE receives the reference signal to perform channel measurement and data modulation. This reference signal is transmitted in a region in which data is transmitted.

The CRS is used for two purposes such as channel information acquisition and data demodulation and the UE-specific reference signal is used only for data demodulation. The CRS is transmitted per subframe over a wide band and reference signals for a maximum of four antenna ports are transmitted according to the number of transmit antennas of the eNB.

For example, if the number of transmit antennas of the eNB is 2, CRSs for antenna ports 0 and 1 are transmitted and, if the number of transmit antennas of the eNB is 4, CRSs for antenna ports 0 to 3 are transmitted.

FIG. 6 is a diagram illustrating a pattern in which CRSs and DRSs defined in a legacy 3GPP LTE system (e.g., release-8) are mapped onto downlink resource block (RB) pairs. A downlink RB pair as a mapping unit of a reference signal may be expressed by one subframe on a time axis and 12 subcarriers on a frequency axis. That is, one RB pair has 14 OFDM symbols in case of a normal CP (FIG. 6(a)) and 12 OFDM symbols in case of an extended CP (FIG. 6(b)), in the time domain.

FIG. 6 shows locations of the reference signals on the RB pairs in a system in which the eNB supports four transmit antennas. In FIG. 6, resource elements (REs) denoted by "0", "1", "2" and "3" represent the locations of the CRSs for antenna port indices 0, 1, 2 and 3. Meanwhile, the RE denoted by "D" represents the location of the DMRS.

In 3GPP LTE-A Release-11 (Rel-11) system and up, an enhanced-PDCCH (EPDCCH) has been considered as a solution for capacity lack of a PDCCH due to coordinated multi point (CoMP) or multi user-multiple input multiple output (MU-MIMO) or PDCCH performance reduction due to inter-cell interference. In the EPDCCH, in order to obtain precoding gain, etc., channel estimation may be performed based on a DMRS, unlike a legacy CRS-based PDCCH.

While the PDCCH is transmitted based on the REG or the CCE composed of REGs, the EPDCCH is transmitted based on an enhanced REG (EREG), an enhanced CCE (ECCE) or a PRB pair. Here, the ECCE may be composed of four EREGs and one PRB pair may be composed of four ECCEs. Similarly to the PDCCH, the concept of the aggregation level is used even in the EPDCCH. However, in the EPDCCH, the aggregation level is based on the ECCE.

EPDCCH transmission may be divided into localized EPDCCH transmission and distributed EPDCCH transmission according to the configuration of the PRB pair used for EPDCCH transmission. Localized EPDCCH transmission means that ECCEs used for transmission of one EPDCCH are adjacent in the frequency domain and specific precoding is applicable in order to obtain beamforming gain. For example, localized EPDCCH transmission may be based on consecutive ECCEs corresponding in number to the aggregation level. In contrast, distributed EPDCCH transmission means that one EPDCCH is transmitted in separated PRB pairs in the frequency domain and has frequency diversity gain. For example, distributed EPDCCH transmission may be based on an ECCE composed of four EREGs which are respectively included in the separated PRB pairs in the frequency domain.

The UE may perform blind decoding as in a legacy LTE/LTE-A system, in order to receive/acquire control information (DCI) via an EPDCCH. More specifically, the UE may attempt (monitor) decoding with respect to a set of EPDCCH candidates per aggregation level, for DCI formats corresponding to a set transmission mode. The set of EPDCCH candidates to be monitored may be referred to as an EPDCCH UE-specific search space and this search space may be set/configured according to aggregation level. In addition, the aggregation level may be {1, 2, 4, 8, 16, 32} according to subframe type, CP length and the amount of available resources in a PRB pair, slightly differently from the legacy LTE/LTE-A system.

Figure 7:
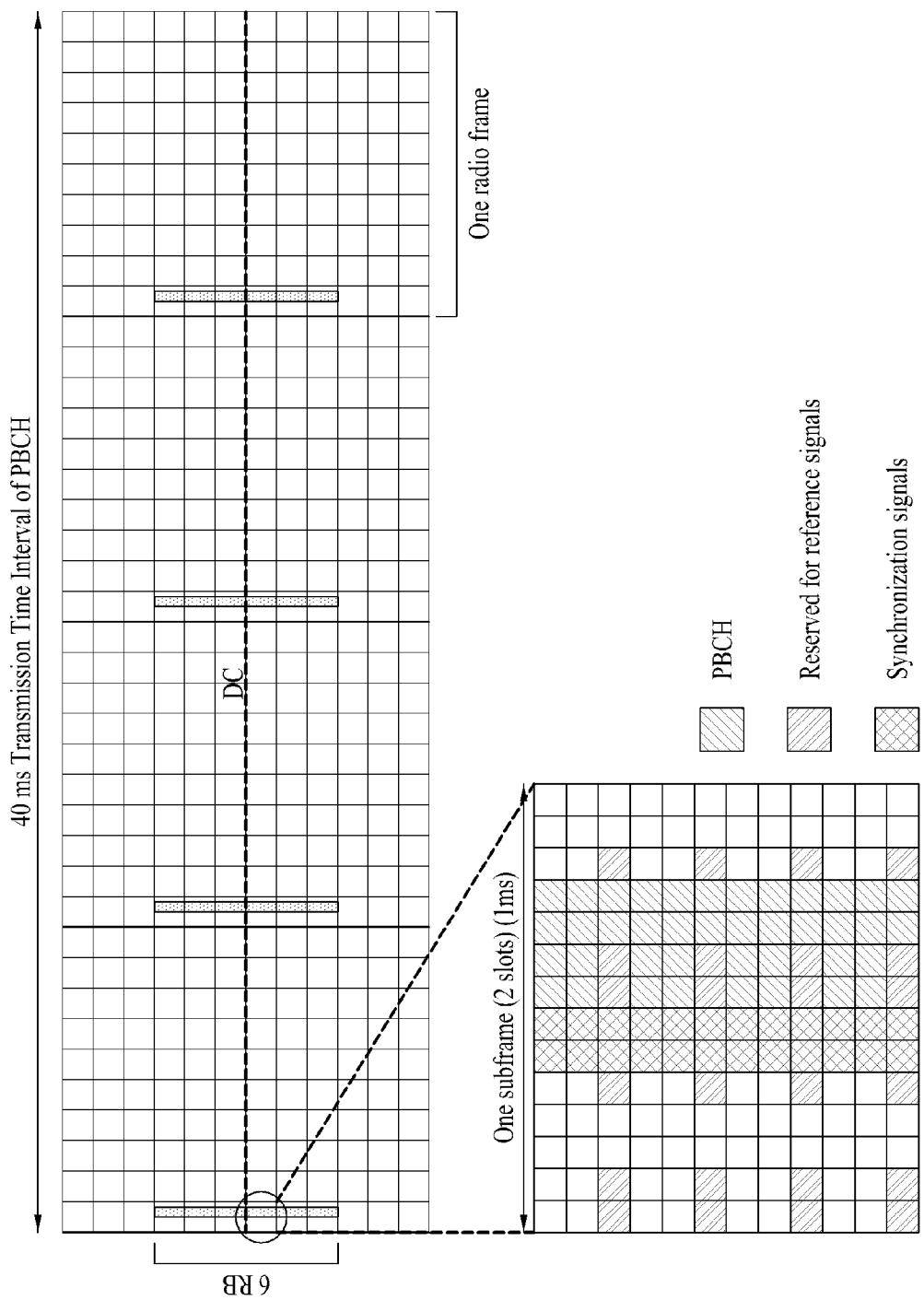
FIG. 7 is a diagram showing an example when the amount of available resources for an EPDCCH is small

Here, when the amount of available resources (e.g., REs) for EPDCCH transmission is not identical in all PRB pairs, the same aggregation level may not guarantee the same coding gain. For example, if it is assumed that the amount of available resources for an EPDCCH in a certain PRB pair corresponds to ¼ the amount of available resources for an EPDCCH in a general PRB pair, aggregation level 23 (32 ECCEs) is necessary to obtain coding gain of aggregation level 8. The amount of available resources for the EPDCCH may be changed in the PRB pair depending on whether a PDCCH is transmitted/the number of OFDM symbols on which the PDCCH is transmitted, whether a CSI-RS is transmitted or whether a zero-power CSI-RS is transmitted. In addition, the amount of available resources for the EPDCCH may be changed according to a subframe configuration (e.g., subframe configurations 0, 5, etc.) such as a special subframe in TDD. In addition, as shown in FIG. 7, the amount of available resources for EPDCCH transmission may be changed according to transmission of a physical broadcast channel (PBCH) and/or a primary synchronous signal (PSS)/secondary synchronous signal (SSS). If the amount of available resources for the EPDCCH is changed in the PRB pair for EPDCCH transmission and, more particularly, if the amount of available resources for the EPDCCH is reduced, a result similar to a low aggregation level may be obtained at a high aggregation level. Accordingly, hereinafter, embodiments for solving such a problem will be described. In addition, various methods for performing blind decoding of a UE in a PRB pair in which the amount of available resources for the EPDCCH is reduced will be described.

Embodiment 1

Embodiment 1 relates to a method for decoding an E-PDCCH using an aggregation level higher than that of a general PRB pair in a PRB pair, in which the amount of available resources for the E-PDCCH is small. That is, a higher aggregation level is used in order to obtain coding gain. That is, upon blind decoding, a UE may use {1, 2, 4, 8} as an aggregation level when the amount of available resources for the EPDCCH is greater than a predetermined value and use {2, 4, 8, 16} as an aggregation level when the amount of available resources for the EPDCCH is less than the predetermined value. In other words, a minimum value among values available as the aggregation levels when the amount of available resources for the EPDCCH is less than the predetermined value may be set to be greater than a minimum value of the values available as the aggregation levels when the amount of available resources for the EPDCCH is greater than the predetermined value. The above-described example of the aggregation level may be a PRB set for a localized EPDCCH, {1, 2, 4, 8, 16} may be used when the amount of available resources for the EPDCCH is large and {2, 4, 8, 16, 32} may be used when the amount of available resources for the EPDCCH is small.

In this case, resource-to-CCE mapping in the PRB pair may be achieved as described below.

First, even in a PRB pair in which the amount of available resources for the EPDCCH is small, the same resource mapping as a general PRB pair may be used. (Here, the general PRB pair means that the amount of available resources for the EPDCCH is relatively large. For example, the general PRB pair means that a PBCH/SCH is not included or indicates a subframe other than a special subframe in TDD, but the present invention is not limited thereto.)

Figure 8:
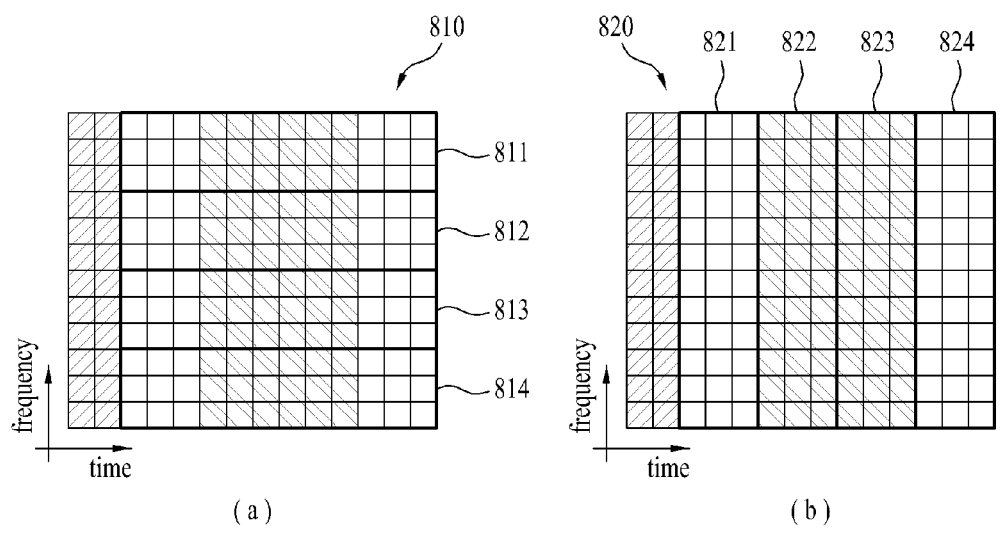
FIG. 8 is a diagram illustrating a method for mapping resources to CCEs in a PRB pair, in which the amount of available resources is small, according to an embodiment of the present invention.

That is, even when the amount of available resources for the EPDCCH is reduced in the PRB pair due to additional signaling or subframe structure, ECCEs may be configured in the PRB pair on the assumption that the PRB pair is a general PRB pair. Accordingly, the ECCE may include available resources for the EPDCCH and resources which are not related to the EPDCCH (e.g., REs for CSI-RS/CRS/PBCH/PSS/SSS). For example, as shown in FIG. 8(a), in a PRB pair 810, ECCEs 811 to 814 may include resources (PBCH and SCH) which are not related to the EPDCCH. (Although, in FIG. 8, a PDCCH is transmitted via two OFDM symbols and a PRB pair on which a PBCH and/or an SCH are transmitted is shown as an example of a PRB pair in which the amount of available resources for the EPDCCH is small and the ECCEs are shown as being divided in the PRB pair using an FDM scheme (FIG. 8(a)) or a TDM scheme (FIG. 8(b)) for convenience, interleaved REs may configure the ECCE.)

From this, it may be substantially understood that the size of each ECCE for transmitting the EPDCCH is reduced. For example, if the number of REs used as the EPDCCH in the PRB pair is reduced to ½ due to PBCH, SCH, etc., the amount of resources used for EPDCCH transmission in each ECCE is also reduced to ½. Accordingly, if the number of EPDCCH candidates of aggregation level 2 in the PRB pair is 2, the substantially same situation as the case in which the number of EPDCCH candidates of aggregation level 1 is 2 may occur.

The UE may extract available resources for the EPDCCH from the PRB pair and perform blind decoding. An eNB may transmit information for enabling a UE to determine resources which are not related to the EPDCCH, that is, time/frequency location or configuration of resources via which the EPDCCH is not transmitted, via higher layer signaling.

Second, in the PRB pair in which the amount of available resources is small, an ECCE composed of available resources for the EPDCCH and an ECCE composed of resources which are not related to the EPDCCH may be distinguishably generated. At this time, the ECCE composed of available resources for the EPDCCH may be referred to as an information ECCE and the ECCE composed of resources which are not used for the EPDCCH may be referred to as a null ECCE. If a sum of available resources in the PRB pair is not equal to a multiple of an ECCE size, available resources may be included in the null ECCE. Referring to FIG. 8(b), in the PRB pair 820 in which the amount of available resources for the EPDCCH is small, the information ECCEs 821 and 824 may be composed of available resources for the EPDCCH only and the null ECCEs 822 and 823 may be composed of resources which are not related to the EPDCCH only.

If the ECCEs in the PRB pair are divided into the information ECCE and the null ECCE, i) the information ECCE and the null ECCE are indexed and included in a search space, ii) the information ECCE and the null ECCE are indexed but the null ECCE is not included in the search space, and iii) only the information ECCE is indexed and included in the search space. Hereinafter, these will be sequentially described.

i) The information ECCE and the null ECCE may be indexed and included in the search space. In this case, since the UE substantially aggregates only the information ECCEs among the ECCEs configuring the aggregation level EPDCCH candidates, only coding gain of a low aggregation level may be substantially guaranteed even at a high aggregation levels. The eNB and the UE need to know a PRB pair of a subframe in which mapping is performed, and the PRB pair of the subframe in which mapping is performed may be predefined or delivered via higher layer signaling.

ii) All ECCEs may be indexed and the search space may be configured but the null ECCE may be skipped upon aggregation. In this case, for example, if an EPDCCH candidate of aggregation level 2 is composed of an information ECCE and a null ECCE, the UE may skip the null ECCE and perform blind decoding of aggregation level 2 using a next information ECCE.

iii) Indexing may be performed except for the null ECCEs. In this case, since the number of ECCEs transmitted on the PRB pair is reduced, the number of antenna ports assigned to the PRB pair may also be reduced. For example, if the number of information ECCEs corresponds to 1 or 2, the number of antenna ports is also 1 or 2. Thus, DMRS overhead may be reduced to 12 REs and thus coding gain may be increased.

Figure 9:
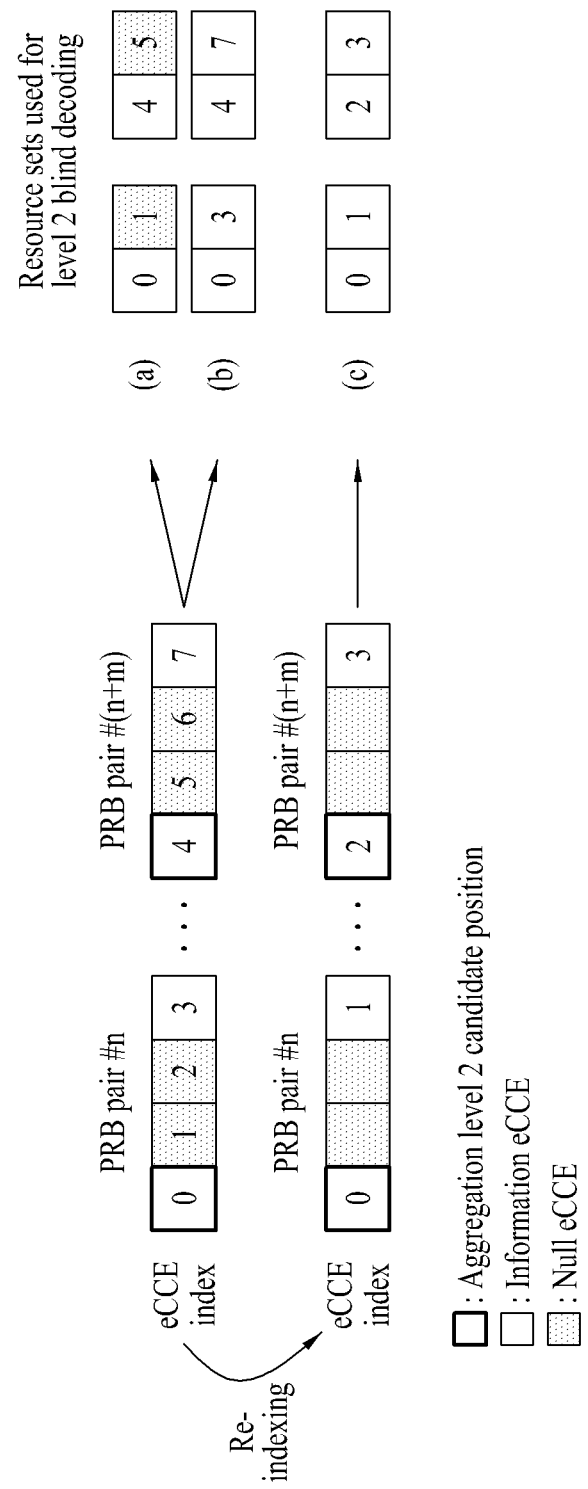
FIG. 9 is a diagram illustrating the configuration of a search space according to an embodiment of the present invention.

The methods for configuring the search space will be described with reference to FIG. 9. In FIG. 9, the ECCEs in the PRB pair may be divided into information ECCEs and null ECCEs and aggregation level 2 is used. In the configuration of the search space, first, information ECCEs and null ECCEs are configured with respect to PRB pairs (PRB pairs #n to #n+m, where, the PRB pairs may be included in a PRB set for localized or distributed EPDCCH transmission indicated by higher layer signaling). Thereafter, the information ECCEs and the null ECCEs may all be indexed and then the information ECCEs and the null ECCEs may all be included in the search space of aggregation level 2 (FIG. 9(a), in case of the above-described search space configuration i)) or the information ECCEs and the null ECCEs may be all indexed and then only the information ECCES may be included in the search space except for the null ECCEs. (FIG. 9(b), in case of the above-described search space configuration ii)). As shown in FIG. 9(c), the null ECCEs may be excluded in the indexing step and the search space may be composed of the information ECCEs only (in case of the above-described search space configuration ii)).

Figure 10:
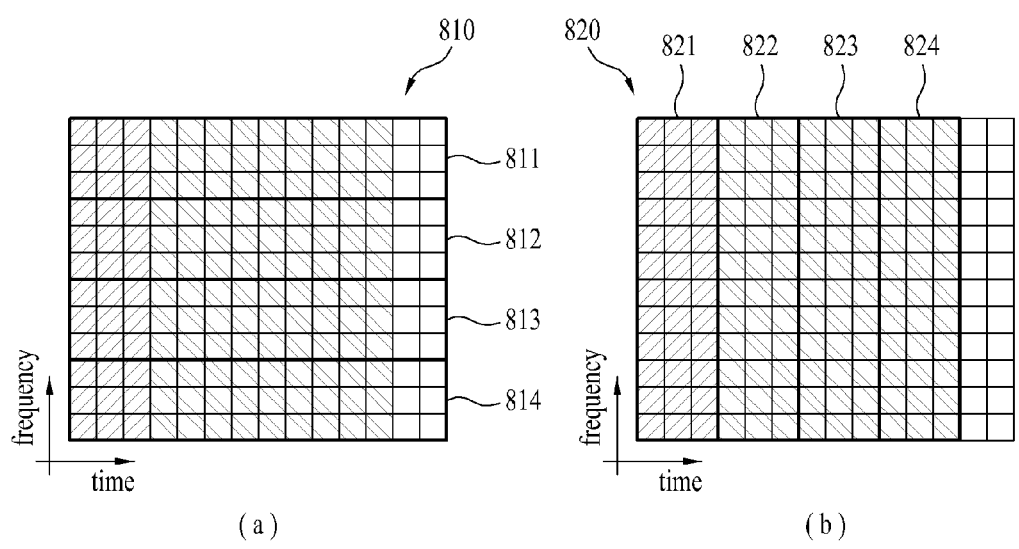
FIG. 10 is a diagram illustrating the case in which an embodiment of the present invention applies to a new carrier type (NCT)

FIG. 10 shows the case in which two resource-to-CCE mapping methods are applied to a new carrier type (NCT) in the above-described PRB pair. In FIG. 10(a), a minimum aggregation level is 4. In addition, in FIG. 10(b), although four ECCEs are physically present in the PRB pair, it may be interpreted as only one substantial ECCE is present in the PRB pair. That is, only one ECCE may be present in the PRB pair. For other descriptions, refer to the description of FIG. 8. In FIG. 10, reference numerals 810 to 824 are used to understand indexing of the ECCEs and the configuration of the search space in the description of FIG. 8, but are not intended to be accurately equal to the reference numerals of FIG. 8.

Embodiment 2

In order to increase coding gain in a PRB pair in which the amount of available resources for an EPDCCH is small, DMRS overhead may be reduced. More specifically, in the PRB pair in which the amount of available resources for the EPDCCH is small, a port is selected from ports {7, 8} or {9, 10}, thereby reducing DMRS overhead from 24 to 12. 12 REs (6 REs if a DMRS is transmitted in 12 REs only in order to perform DMRS based transmission in a PRB pair on which a synchronization signal is transmitted) are used as available resources for the EPDCCH (that is, as information REs), thereby increasing coding gain of the PRB pair.

In the present invention, the number of ports in the PRB pair may be determined based on the amount of available resources for the EPDCCH and the ECCE size in the PRB pair. That is, after an effective ECCE is determined by any one of Equation 2 or Equation 3, the number of antenna ports corresponding to the number of effective ECCEs may be determined. In other words, assume that the effective ECCEs are transmitted via different antenna ports.

$$\text{\# of effective } eCCEs = \left\lfloor \frac{\text{\# of available } REs \text{ for } E\text{-}PDCCH}{eCCE \text{ size(\# of } REs)} \right\rfloor \quad \text{Equation 2}$$

$$\text{\# of effective } eCCEs = \left\lceil \frac{\text{\# of available } REs \text{ for } E\text{-}PDCCH}{eCCE \text{ size(\# of } REs)} \right\rceil \quad \text{Equation 3}$$

For example, if the amount of available resources is 72 REs and the eCCE size is 36 REs, the number of effective ECCEs may be 2 and the number of used antenna ports may be 2, in the PRB pair. If the number of determined ports is 1 or 2, the port is preferably selected from {7, 8} or {9, 10}.

The method for determining the number of antenna ports or the port is applicable to the methods i), ii) and iii) for configuring the search space in Embodiment 1. More specifically, the method for determining the number of antenna ports or the port are applicable to the methods i) and ii) for configuring the search space to the point of estimating the number of antenna ports, and the number of ECCEs used for actual EPDCCH transmission and the number of effective ECCEs may be different. In method iii) for configuring the search space, the number of effective ECCEs may be equal to the number of physical ECCEs.

Embodiment 3

In a PRB pair in which the amount of available resources for the EPDCCH is reduced, a UE may exclude the PRB pair from a search space. In other words, if the amount of available resources for the EPDCCH in the PRB pair is equal to or less than a predetermined value, the PRB pair or ECCEs belonging to the PRB pair may be excluded from the configuration of the search space. Here, the predetermined value may be predefined or indicated via higher layer signaling. At this time, control signaling of the subframe may use a legacy PDCCH or a method for performing control signaling of the subframe in advance in a previous subframe may be used. For example, assume that the EPDCCH is not transmitted in special subframe configurations 0 and 5 (normal CP) and 0, 4 and 7 (extended CP) of TDD.

Although the case in which the aggregation level is changed according to the amount of available resources for the EPDCCH in the PRB pair is described in Embodiment 1, similarly, the aggregation level with regard to the DCI may be changed according to the coding rate (or system bandwidth) of the DCI. Changing the aggregation level may mean that blind decoding for aggregation level 1 is omitted and blind decoding for aggregation level 1 may be performed only when a coding rate (or system bandwidth) at aggregation level 1 is equal to or less than a predetermined level. An element for determining the coding rate of each DCI in the EPDCCH is the number of information bits of the DCI, the number of available REs used for EPDCCH transmission in each ECCE, etc. Here, the number of information bits of the DCI is changed according to DCI format and the number of bits used for resource assignment in the same DCI format is changed according to the amount of resources, therefore, aggregation level with regard to the DCI is changed by taking into account that the number of information bits is changed according to system bandwidth. That is, the aggregation level is changed by taking into account that the coding rate of the same DCI is changed according to system bandwidth.

If the amount of available resources for the EPDCCH is small, and, more particularly, in a PRB pair on which a synchronization signal (PSS/SSS) is transmitted, DMRS based transmission needs to be performed, as will now be described.

Figure 11:
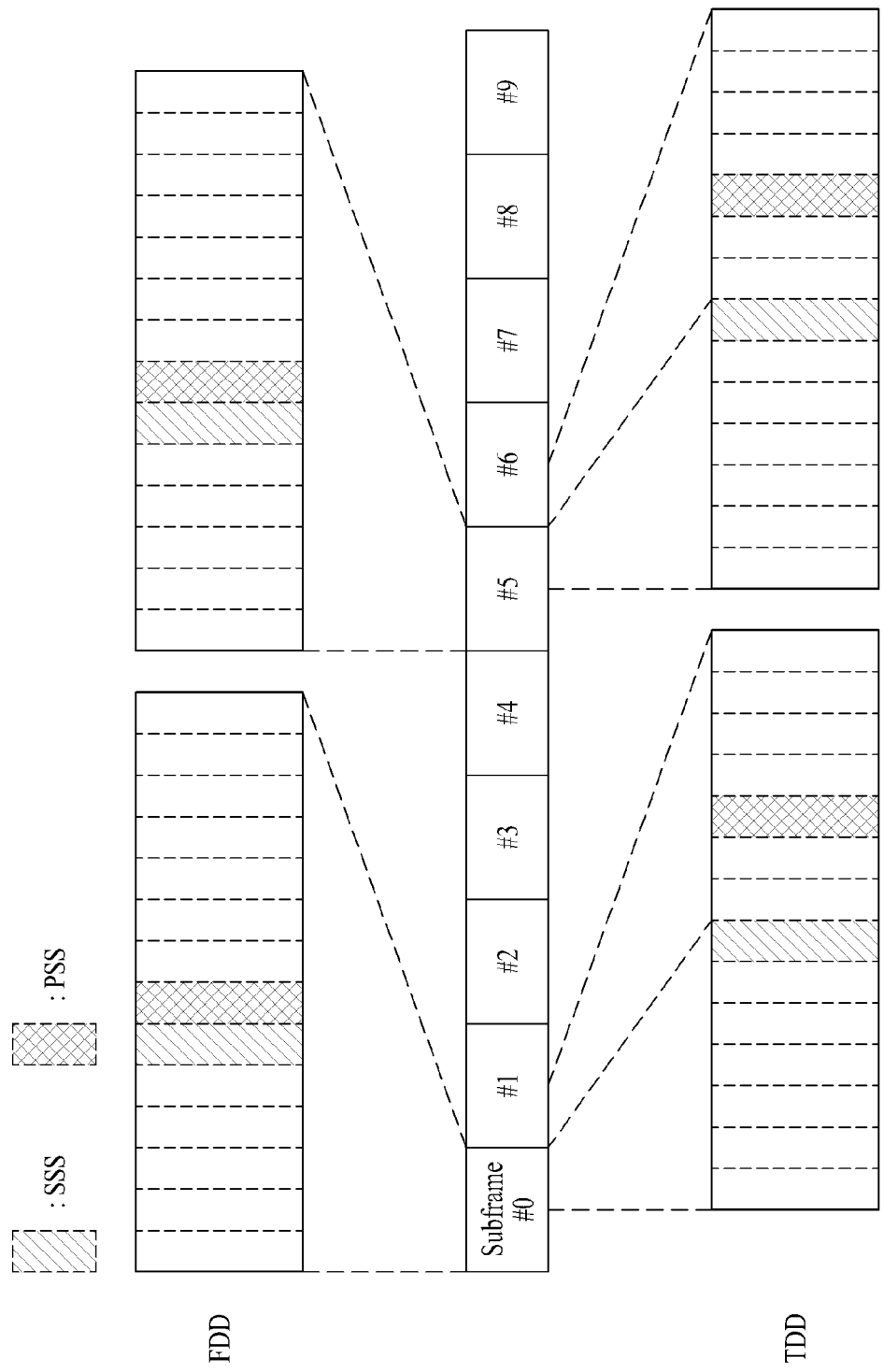
FIG. 11 is a diagram showing synchronization signal transmission for better understanding of demodulation reference signal (DMRS) based transmission according to an embodiment of the present invention.

As shown in FIG. 11, the PSS/SSS may be transmitted on sixth and seventh OFDM symbols of a first slot of a subframe in FDD and on a seventh OFDM symbol of a first slot and a third OFDM symbol of a second slot of a subframe in TDD. In particular, the PSS/SSS may be transmitted in a region corresponding to 6 RBs which are located at the center of the entire frequency band in the OFDM symbols in FDD. The DMRS may be transmitted on sixth and seventh OFDM symbols of first and second slots of a subframe. That is, the PSS/SSS may overlap the DMRS. Methods for performing DMRS based transmission will be described with reference to FIGS. 12 to 13.

Figure 12:
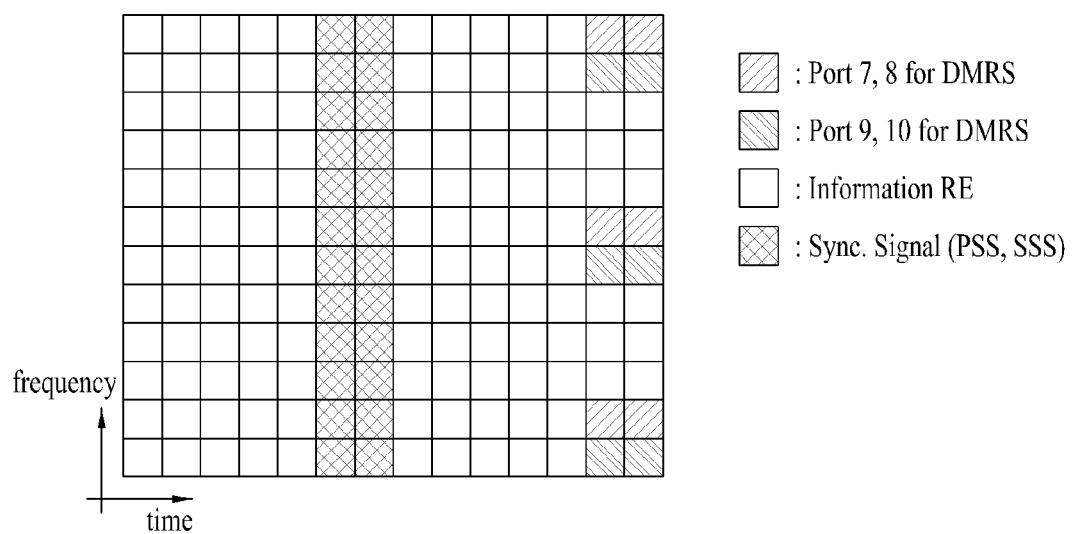
FIGS. 12 and 13 are diagrams illustrating DMRS based transmission according to an embodiment of the present invention.

FIG. 12 shows a method for performing DMRS based transmission in FDD. In FDD, the PSS and the SSS are transmitted on the last two OFDM symbols of a #0 and #10 slots in a radio frame (that is, the subframes shown in FIG. 12 are #0 and #5 subframes in the radio frame). To this end, only the DMRS transmitted on the second slot of the PRB pair may be configured to be used to perform channel estimation of the PRB pair.

Figure 13:
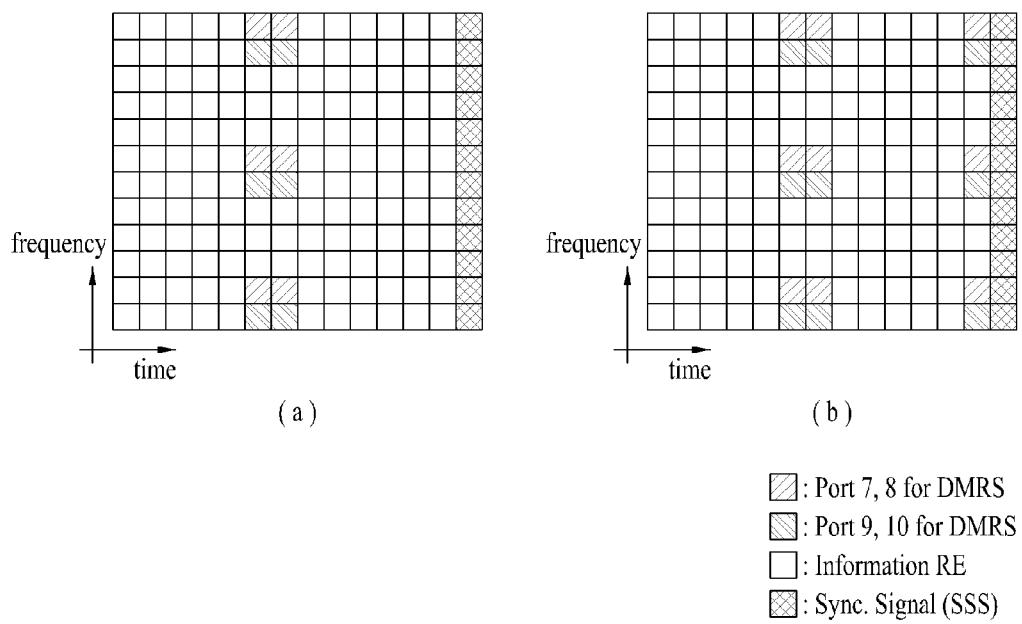

FIG. 13 shows two methods for performing DMRS based transmission in TDD.

As a first method, as shown in FIG. 13(a), the DMRS may not be transmitted on the second slot of the PRB pair, on which the SSS is transmitted, and an information RE for a PDSCH or EPDCCH may be inserted into a DMRS transmission position of a twelfth OFDM symbol. In this case, channel estimation in the PRB pair may be performed using the DMRS of a first slot.

As a second method, as shown in FIG. 13(b), the SSS may be transmitted on the last OFDM symbol of the second slot of the PRB pair and the DMRS may be transmitted on the sixth OFDM symbol of the second slot. In this case, in order to guarantee code divisional multiplexing (CDM), only one of the ports belonging to the same CDM group may be used. For example, if transmission is performed via DMRS ports 7, 8, 9 and 10, only combinations such as {7, 9}, {7, 10}, {8, 9}, {8, 10}, etc. may be used in the PRB pair.

The above description may be suitable for EPDCCH transmission when system bandwidth is narrow. Since the EPDCCH is transmitted based on the DMRS, the EPDCCH may not be used in specific subframes (FDD: slot #0 and #10, TDD: slot #1 and #11) in case of a narrow bandwidth channel (e.g., 6 REs). This can be solved by applying the above-described methods. In order to prevent channel estimation performance from being reduced, the size of the resource set (e.g., eREG, ECCE, etc.) used for the EPDCCH or aggregation level in the PRB pair may be increased to increase coding gain.

Figure 14:
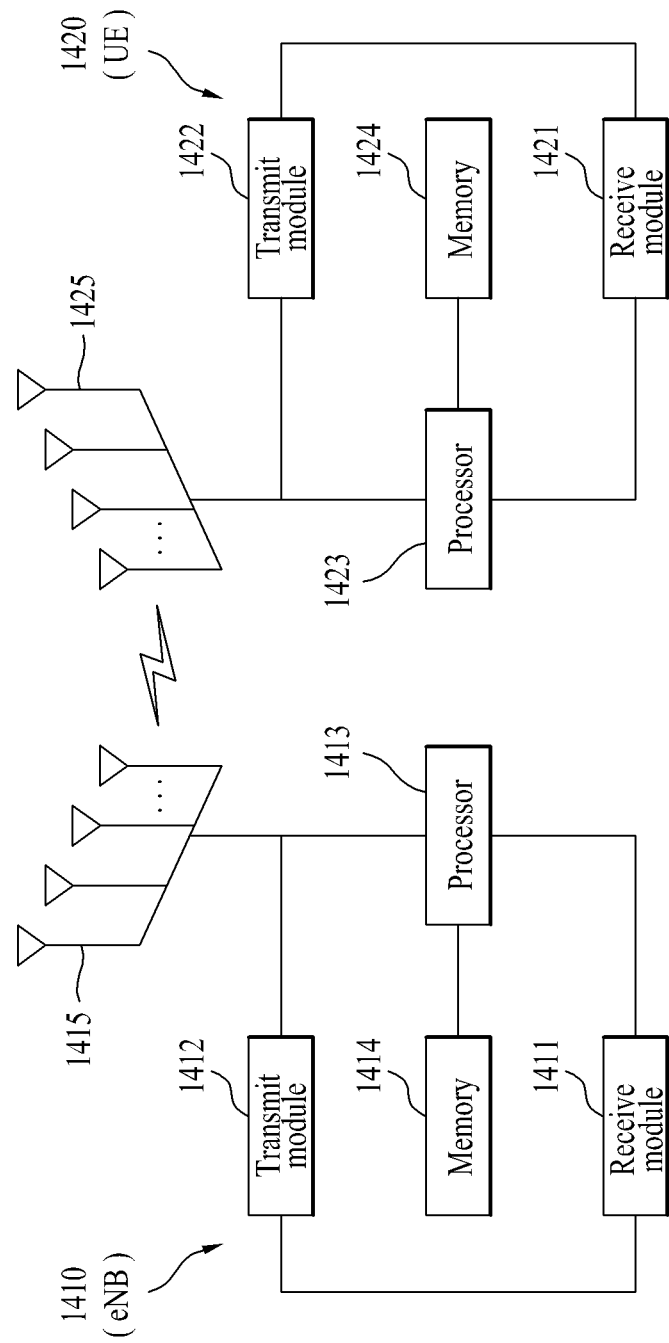
FIG. 14 is a diagram showing the configuration of a transmission apparatus and a reception apparatus.

FIG. 14 is a diagram showing the configuration of a transmission point apparatus and a UE apparatus according to an embodiment of the present invention.

Referring to FIG. 14, the transmission point apparatus 1410 according to the present invention may include a reception module 1411, a transmission module 1412, a processor 1413, a memory 1414 and a plurality of antennas 1415. Since the plurality of antennas 1415 is used, the transmission point apparatus may support MIMO transmission/reception. The reception module 1415 may receive a variety of signals, data and information from the UE in uplink. The transmission module 1412 may transmit a variety of signals, data and information to the UE in downlink. The processor 1413 may control the overall operation of the transmission point apparatus 1410.

The processor 1413 of the transmission point apparatus 1410 according to one embodiment of the present invention may process the operations necessary for the above-described embodiments.

The processor 1413 of the transmission point apparatus 1410 may process information received by the transmission point apparatus 1410 and information to be transmitted to an external device and the memory 1414 may store the processed information for a predetermined time and may be replaced by a component such as a buffer (not shown).

Referring to FIG. 14, the UE apparatus 1420 according to the present invention may include a reception module 1421, a transmission module 1422, a processor 1423, a memory 1424 and a plurality of antennas 1425. Since the plurality of antennas 1425 is used, the UE apparatus may support MIMO transmission/reception. The reception module 1425 may receive a variety of signals, data and information from the eNB in downlink. The transmission module 1422 may transmit a variety of signals, data and information to the eNB in uplink. The processor 1423 may control the overall operation of the UE apparatus 1420.

The processor 1423 of the UE apparatus 1420 according to one embodiment of the present invention may process the operations necessary for the above-described embodiments.

The processor 1423 of the UE apparatus 1420 may process information received by the UE apparatus 1420 and information to be transmitted to an external device and the memory 1414 may store the processed information for a predetermined time and may be replaced by a component such as a buffer (not shown).

In the above-described detailed configuration of the transmission point apparatus and the UE apparatus, details of the above-described various embodiments of the present invention may be independently applied or 2 or more embodiments may be applied at the same time. In this case, overlapping details will be omitted from the description for simplicity and clarity.

Furthermore, in the description of FIG. 14, the description of the transmission point apparatus 1410 may also be equally applied to a device functioning as a downlink transmission entity or an uplink reception entity. The description of the UE, apparatus 1420 may also be equally applied to a relay station device functioning as an uplink transmission entity or a downlink reception entity.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method for receiving control information at a user equipment (UE) in a wireless communication system, the method comprising:
receiving, at the UE, a subframe including an enhanced physical downlink control channel (EPDCCH); and
monitoring, at the UE, a set of EPDCCH candidates at each aggregation level of an aggregation levels set,
wherein the aggregation levels set is set differently according to the number of Resource Elements (REs) for the EPDCCH in a physical resource block (PRB) pair that includes a fixed number of enhanced control channel elements (ECCEs),
wherein a minimum level of the aggregation levels set is determined as a first level when the number of the REs for the EPDCCH in the PRB pair is less than a predetermined value;
wherein the minimum level of the aggregation levels set is determined as a second level when the number of the REs for the EPDCCH in the PRB pair is greater than the predetermined value; and wherein the first level is greater than the second level.

2. The method according to claim 1, wherein the aggregation level set is 2, 4, 8 and 16 when the number of the REs for the EPDCCH in the PRB pair is less than the predetermined value, and the aggregation level set is 1, 2, 4 and 8 when the number of the REs for the EPDCCH in the PRB pair is greater than the predetermined value.

3. The method according to claim 1, wherein the fixed number is 2 or 4.

4. The method according to claim 1, wherein the ECCE includes available resources for the EPDCCH and resources unrelated to the EPDCCH.

5. The method according to claim 4, wherein the UE extracts and decodes only the available resources for the EPDCCH from the ECCE.

6. The method according to claim 4, wherein the UE receives information for determining the resources unrelated to the EPDCCH from a base station.

7. The method according to claim 6, wherein the information is received via higher layer signaling.

8. The method according to claim 4, wherein the UE excludes an ECCE of a PRB pair, on which at least one of a physical broadcast channel (PBCH) or a synchronization channel is transmitted, upon attempting decoding.

9. The method according to claim 1, wherein the PRB pair is included in any one of PRB pairs for localized EPDCCH transmission and PRB pairs for distributed EPDCCH transmission.

10. A user equipment (UE) apparatus in a wireless communication system, the UE apparatus comprising:
a receiver; and
a processor configured to:
receive a subframe including an enhanced physical downlink control channel (EPDCCH); and
monitor a set of EPDCCH candidates at each aggregation level of an aggregation levels set, and
the aggregation levels set is set differently according to the number of Resource Elements (REs) for the EPDCCH in a physical resource block (PRB) pair that includes fixed enhanced control channel elements (ECCEs),
wherein a minimum level of the aggregation levels set is determined as a first level when the number of the REs for the EPDCCH in the PRB pair is less than a predetermined value;
wherein the minimum level of the aggregation levels set is determined as a second level when the number of the REs for the EPDCCH in the PRB pair is greater than the predetermined value; and
wherein the first level is greater than the second level.

* * * * *